United States Patent
Lenes

(10) Patent No.: US 9,464,750 B2
(45) Date of Patent: Oct. 11, 2016

(54) TUBULAR COMPONENT WITH AN INTERNAL WEAR-RESISTANT SURFACE

(75) Inventor: Erik Lenes, Fana (NO)

(73) Assignee: Materix AS, Blomsterdalen (NO)

( * ) Notice: Subject to any disclaimer, the term of this patent is extended or adjusted under 35 U.S.C. 154(b) by 38 days.

(21) Appl. No.: 14/130,255

(22) PCT Filed: Jun. 28, 2012

(86) PCT No.: PCT/NO2012/050126
§ 371 (c)(1),
(2), (4) Date: Feb. 25, 2014

(87) PCT Pub. No.: WO2013/009188
PCT Pub. Date: Jan. 17, 2013

(65) Prior Publication Data
US 2014/0216593 A1    Aug. 7, 2014

(30) Foreign Application Priority Data
Jul. 12, 2011   (NO) .................................... 20111015

(51) Int. Cl.
*F16L 57/06*    (2006.01)
*E21B 17/10*    (2006.01)

(52) U.S. Cl.
CPC ............ *F16L 57/06* (2013.01); *E21B 17/1007* (2013.01)

(58) Field of Classification Search
CPC ................................. F16L 57/06; F16L 13/06
USPC ........................... 138/36, 91, 96 R, 113, 141
See application file for complete search history.

(56) References Cited

U.S. PATENT DOCUMENTS

| 3,794,359 A | * | 2/1974 | Fisher .............................. 285/55 |
| 3,848,905 A | * | 11/1974 | Hammer et al. ........... 285/288.1 |
| 4,117,201 A | * | 9/1978 | Keifert .......................... 428/591 |
| 4,199,010 A | * | 4/1980 | McGuth et al. .............. 138/140 |
| 4,447,076 A | | 5/1984 | Evans |
| 4,478,253 A | * | 10/1984 | Everett ........................ 138/140 |
| 4,606,783 A | * | 8/1986 | Guest ........................... 156/73.1 |
| 4,633,913 A | | 1/1987 | Carty et al. |
| 4,659,116 A | * | 4/1987 | Cameron ........................ 285/27 |

(Continued)

FOREIGN PATENT DOCUMENTS

| CN | 201071983 Y | 6/2008 |
| DE | 199 29 132 C1 | 12/2000 |
| DE | 102006007203 A1 | 8/2007 |
| DE | 20 2009 003 897 U1 | 5/2009 |
| JP | 60-197770 A | 10/1985 |
| WO | 9527866 | 10/1995 |

OTHER PUBLICATIONS

International Search Report for parent application PCT/NO2012/050126, having a mailing date of Oct. 3, 2012.

(Continued)

*Primary Examiner* — Paul R. Durand
*Assistant Examiner* — Vishal Pancholi
(74) *Attorney, Agent, or Firm* — Andrus Intellectual Property Law, LLP

(57) ABSTRACT

A tubular component is for a pipe system. The tubular component comprises an external shell and an internal wear element which is attached to the inner jacket surface of the shell by a bonding mass in a first annular space formed between the outer jacket surface of the wear element and the inner jacket surface of the shell, the bonding mass being constituted by a hyperelastic bonding mass. A method is for attaching the wear element to the tubular component. Use of a hyperelastic bonding mass is for such attaching.

22 Claims, 6 Drawing Sheets

(56) References Cited

U.S. PATENT DOCUMENTS

| | | | |
|---|---|---|---|
| 4,684,155 A * | 8/1987 | Davis | 285/16 |
| 4,691,740 A * | 9/1987 | Svetlik et al. | 138/109 |
| 4,804,207 A | 2/1989 | Berchem et al. | |
| 5,634,598 A * | 6/1997 | Colavito et al. | 239/591 |
| 5,678,607 A * | 10/1997 | Krywitsky | 138/89 |
| 6,000,436 A | 12/1999 | Auvil et al. | |
| 6,220,363 B1 | 4/2001 | Dallas | |
| 6,467,812 B1 * | 10/2002 | Klemm et al. | 285/55 |
| 6,474,698 B2 * | 11/2002 | Dobler et al. | 285/321 |
| 6,832,785 B1 * | 12/2004 | Zitkovic, Jr. | 285/21.1 |
| 7,488,010 B2 * | 2/2009 | Wellman et al. | 285/364 |

OTHER PUBLICATIONS

Written Opinion for parent application PCT/NO2012/050126, having a mailing date of Oct. 3, 2012.

Applicant's Reply of May 10, 2013 to Written Opinion for parent application PCT/NO2012/050126, having a mailing date of Oct. 3, 2012.

Written Opinion for parent application PCT/NO2012/050126, having a mailing date of Sep. 2, 2013.

International Preliminary Report for parent application PCT/NO2012/050126, having a completion date of Oct. 4, 2013.

* cited by examiner

TUBULAR COMPONENT WITH AN INTERNAL WEAR-RESISTANT SURFACE

CROSS-REFERENCE TO RELATED APPLICATIONS

This application is the U.S. national stage application of International Application No. PCT/NO2012/050126, filed Jun. 28, 2012, which International application was published on Jan. 17, 2013 as International Publication No. WO 2013/009188 A1 in the English language and which application is incorporated herein by reference. The International application claims priority of Norwegian Patent Application No. 20111015, filed Jul. 12, 2011, which application is incorporated herein by reference.

The invention relates to a tubular component with an internal wear-resistant surface for use in pipe systems conveying aggressive and/or abrasive fluids in the oil and gas industry, the mineral-processing industry and in other processing industries. More particularly, the invention relates to hyperelastically attaching a wear element to the shell of the pipe system.

A fluid which may be constituted by an abrasive fluid flow with a high content of sand and particles subjects tubular components, through which the fluid is conveyed, to great wear. Used drilling fluid with a high content of sand and cuttings particles is an example of such an abrasive fluid. In particular, tubular components that include bends are subjected to great wear in consequence of the forced change of direction of the fluid, and holes are eroded in the walls of pipe bends. Tubular components with wear holes must be replaced, and this requires a shutdown. In pipe systems conveying an abrasive fluid, downtime due to a shutdown constitutes an economic loss. Thus, there is a need to increase the service life of the most wear-prone components in a pipe system. Such tubular components may be pipe bends like elbow bends of different anglings for example 45° or 90°, U-bends, concentric or eccentric reduction pieces for choking, T-joints or other branching components in which the flow direction of the fluid is changed.

It is known to use a pipe bend which is constituted by a composite material. The pipe bend is adapted to the existing standard solutions and geometries that are used in known pipe systems. The pipe bend may easily be connected to straight pipes in a pipe system by means of flanges or mechanical clamping connections, for example. This enables easy replacement of the vulnerable, conventional pipe bends with pipe bends of a composite material.

Within the art, it is further known to increase the wear resistance of a pipe bend by coating the internal shell surface of the pipe bend with a ceramic thin-film coating. It is also known to coat the inner shell surface with a hard-metal coating by means of hardfacing or a tungsten carbide by means of flame brazing. It is further known to glue a ceramic casing with a thin, linearly elastic layer of glue or to press-fit a ceramic casing. For specially shaped metallic pipe bends, ceramic inserts in the form of segmented rings are used in some cases. The segmented rings may be mitred into an angle.

It is also known within the art to use metallic pipe bends with extra-large bending radii, so-called long-radius bends. The radius may be typically 5 to 10 times the pipe diameter to minimize the wear.

The drawback of ceramic thin-film coatings is that they are thin and crack because of the different thermal expansion in relation to the surrounding metal jacket in the bend. The lifetime is limited in aggressive environments.

The drawback of surfacing with hard metals is that the thickness of the coating reduces the internal diameter and entails an undesired choking of the fluid flow with a subsequent pressure change across the component. Further, heat introduction during the welding process may alter the material properties of the material of the jacket, which may reduce the firmness or toughness of the tubular component.

Brazing of thin tungsten carbide coatings is difficult to carry out because of the thermal expansion of the coating. Coating with thick tungsten carbide coatings reduces the internal diameter and with subsequent choking of the fluid flow through the component, making the formation of transitions and adaptations to seals difficult. Tungsten carbide is also a material which corrodes if the fluid is both aggressive and abrasive.

Ceramic casings that are glued to the internal jacket surface will exhibit poorer adhesion over time and are vulnerable to thermal expansions. A thin glue film will behave approximately linearly elastically. Within a narrow strain range, the glue film will regain its original shape when relieved, but strains beyond this narrow range will lead to breaks and delamination. Press-fitted ceramic casings are very sensitive to thermal expansion. Segmented ceramic rings require specially adapted bends which will be large and heavy, and which have low pressure capacity.

Long-radius bends require more space than conventional bends. In mobile drilling rigs, for example, space is limited, which makes the use of long-radius bends difficult in such installations. The tubular component having an internal wear-resistant surface in accordance with the invention will give considerable space-saving as the ratio may be reduced to one and a half or less than one time(s) the pipe diameter.

The invention has for its object to remedy or reduce at least one of the drawbacks of the prior art or at least provide a useful alternative to the prior art.

The object is achieved through features which are specified in the description below and in the claims that follow.

One object of the invention is to provide a tubular component with an internal wear-resistant surface which has a longer life than standard metallic tubular components used in pipe systems or pipelines for conveying a corrosive and abrasive fluid flow. Thereby the time between replacements is increased and the overall downtime is reduced. The tubular component with an internal wear-resistant surface in accordance with the invention comes as one unit and may easily be connected to pipe systems by methods known within the art, such as welding, or connection by means of a flange connection, and is not more space-demanding than standard tubular components.

The tubular component is used pipe systems or pipelines conveying an aggressive and/or abrasive flow of fluid, in which corrosion, sand and particles erode holes into the walls of metallic tubular components. The fluid flow may be a liquid flow or a gas flow. A wear element such as a ceramic casing lies positioned within the shell of the tubular component and is held in place with a flexible bonding mass. The wear element may be positioned concentrically within the shell. The wear element prevents the internal jacket surface of the shell, in geometries that are meant to change the fluid flow directionally, from being exposed to the abrasive and/or aggressive fluid flow. The wear element functions as a thick-wailed wear coating, and has a substantially higher wear resistance than the shell alone. The tubular component provided with the wear element will have a longer lifetime than conventional tubular components in which the shells are constituted by carbon steel, stainless steel or nickel alloys, and which are exposed to a fluid flow containing sand and particles, for example.

Ceramic materials are known for their good resistance to erosion compared with metals and metal alloys. However, ceramic materials are brittle and not very tough in nature. Therefore they are not suitable as pressure shells on their own in tubular components because of the risk of brittle fractures and can therefore seldom be used as the only barrier against the surroundings in pressurized tubular components. The pressure integrity of a pipe bend, for example, must therefore be ensured by a material of sufficient toughness in accordance with effective official requirements and industrial requirements. By building in and adapting a ceramic casing in a standardized bend constituted by a metal or a metal alloy, the standard bend forming the pressure shell itself, the wear resistance will increase, as the surrounding standard bend will not be exposed to the abrasive fluid. This gives increased lifetime and reduced downtime for the pipe system.

Ceramic materials are hard and compression-proof, but also brittle/not very elastic materials. They are sensitive to mechanical tension loads and bending loads. By using a flexible hyperelastic polymer material, forming a surrounding radial jacket around a thick-walled ceramic wear element, in combination with seals at the end surfaces of the wear element, where the seals are placed in axially resilient seal housings, it is achieved that the ceramic wear element lies "floating" within the surrounding shell while, at the same time, the wear element is preloaded to counteract axial tensile forces from the fluid flowing through the pipe system. The seals may be constituted by an elastomer. The wear element has the freedom to accommodate displacements, so that critical, mechanical stresses will not be transmitted from the surroundings to the wear element to any great extent.

By a hyperelastic polymer material is meant a polymer material which can be deformed by an external load and which returns to its original shape when unloaded. A hyperelastic polymer material can be stretched, it can be compressed and it can absorb shear forces. Rubber is a known hyperelastic material. Other known hyperelastic materials include polyurethane, silicone, fluorosilicone, polyacrylate, neoprene, fluorocarbon and nitrile.

In a first aspect, the invention relates to a tubular component in a pipe system, the tubular component including an external shell and an internal wear element which is attached to the inner jacket surface of the shell with a bonding mass in a first annular space formed between the outer jacket surface of the wear element and the inner jacket surface of the shell, the bonding mass being constituted by a hyperelastic material. The wear element may be constituted by a ceramic material. The wear element may be concentrically positioned in the shell.

In at least one and portion, the tubular component may be provided with an end piece which, at its first end portion facing the tubular component, is provided with an internal stepping forming a shoulder in the inner jacket surface of the end piece and being provided, in its shoulder, with a circumferential groove in the axial direction of the end piece, arranged to accommodate an axially acting resilient element.

In at least one end portion, the tubular component may be provided with a movable, radial seal housing which, in a portion facing the tubular component, may be arranged to accommodate a first sealing element arranged to seal axially between the wear element and the seal housing, and, in a portion facing away from the tubular component, the seal housing may be provided with a ring complementarily adapted to the circumferential groove of the end piece and arranged to be preloaded against the axially acting resilient element of the end piece.

The ring of the seal housing may be provided with at least one second sealing element arranged to seal between the ring and the side surfaces of the groove. The first sealing element of the seal housing may be arranged to position the wear element in the radial direction. The first sealing element of the seal housing may be constituted by a sealing element and a radial positioning element.

The outer jacket surface of the seal housing and the inner jacket surface of the end piece may form a second annular space between them, and the jacket of the seal housing may be provided with at least one through-going, radial bore, so that the second annular space is in fluid communication with the fluid channel of the tubular component.

The seal-housing end portion facing the tubular component may form a heat shield. The shell and wear element of the tubular component may project beyond the edge portion of the bonding mass and may form an open annular-space portion.

The end piece may be attached to the shell with a fastening means selected from a group including a weld, flange connection, integrated grooving and hub connection. At its second end portion, the end piece may be provided with a fastening means arranged to attach the tubular component to a pipe system, wherein the fastening means may have been selected from a group including a weld, flange connection, integrated grooving and hub connection.

The hyperelastic bonding mass may be selected from a group including polyurethane, silicone, fluorosilicone, polyacrylate, neoprene, fluorocarbon and nitrile.

The invention also relates to a pipe system for conveying an abrasive and/or aggressive fluid, wherein the pipe system may be provided with at least one tubular component in accordance with the invention.

In a second aspect, the invention relates to a method of lining a tubular component with a wear element, the method including the steps of:

a) positioning the wear element inside the shell of the tubular component and in such a way that a first annular space is formed between the outer jacket surface of the wear element and the inner jacket surface of the shell;

b) positioning a sealing bottom strip at the first end portion of the tubular component in the first annular space; and c) filling up the first annular space with a hyperelastic bonding mass from the second end portion of the tubular component.

In step a), the method may further include positioning the wear element concentrically in the shell.

The filling up of the first annular space with the hyperelastic bonding mass may be stopped before the entire first annular space has been filled at the second end portion of the tubular component, so that an open annular-space portion is formed in the first annular space.

In a third aspect, the invention relates to the use of a hyperelastic bonding mass for attaching a wear element to the inner jacket surface of a shell in a tubular component.

In what follows, an example of a preferred embodiment is described, which is visualized in the accompanying drawings, in which.

Figure 1:
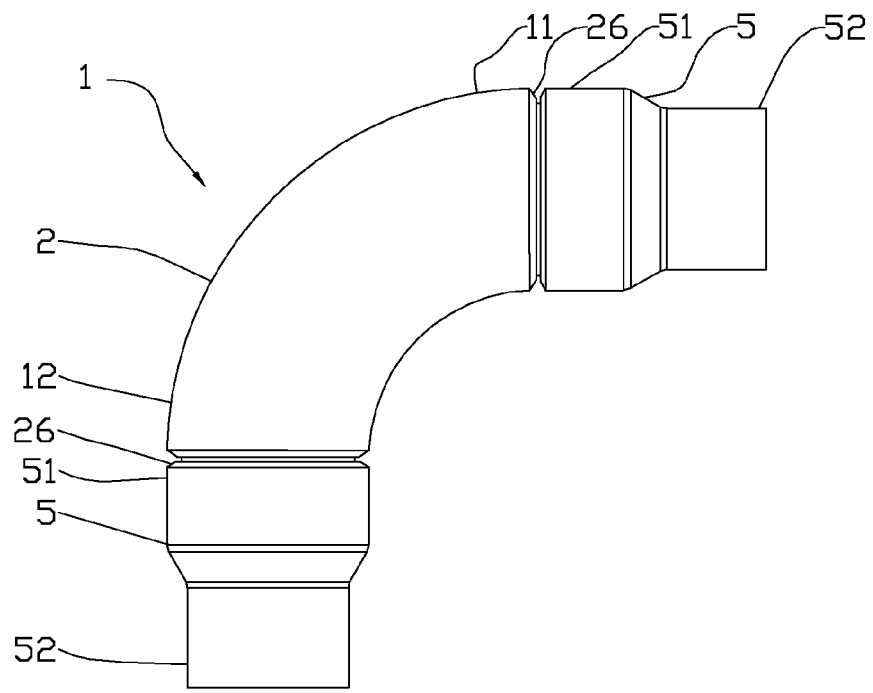
FIG. 1 shows a side view of a tubular component in accordance with the invention.
Figure 2:
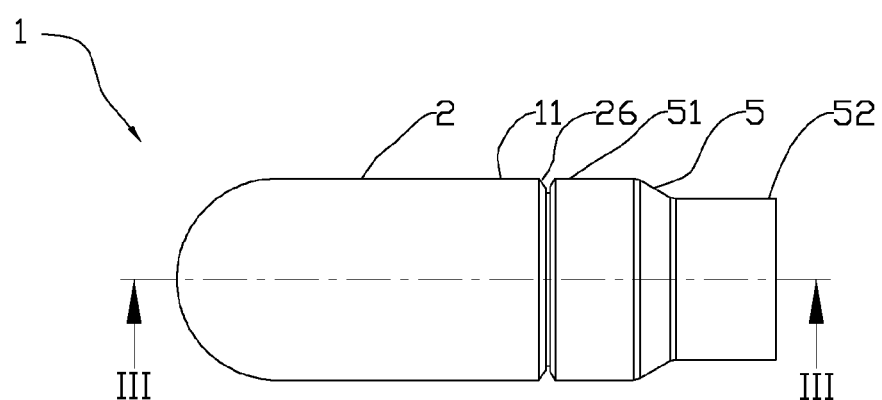
FIG. 2 shows, on the same scale as FIG. 1, atop view of the tubular component.

In the drawings, the reference numeral 1 indicates a tubular component in accordance the figures. In the figures, the tubular component 1 is shown as a 90° elbow bend and as a U-bend to visualize the structural features. However, the invention is not limited to such bends, but can also be used together with bends having other angles, such as 30°, 45° and 60°, for example, and together with, for example, straight tubular components 1, concentric or eccentric reduction pieces for choking and on T-shaped tubular components 1 and on other tubular components 1 known in the art.

The tubular component 1 includes a shell 2. The shell 2 may be constituted by a metal or a metal alloy such as carbon steel, stainless steel or a nickel alloy, for example. The shell 2 may alternatively be constituted by a composite material. The tubular component 1 shown is provided with an end piece 5 at its first end portion 11 and its second end portion 12. The end piece 5 may be constituted by a metal or a metal alloy or a composite material. An end piece 5 which is constituted by a metal or a metal alloy is referred to in the art as a welding end. Between the end portion 51 of the end piece 5 and the shell 2 at the end portions 11, 12, a welding groove 26 may be formed, which may be filled with a fastening means 27 such as a weld 27 if the material of the shell 2 and end piece 5 allows such a joining method. Other fastening means 27 may include a flange connection, integrated grooving and a hub connection.

A wear element 3 is positioned inside the shell 2 in such a way that an annular space 91 is formed between the inner jacket surface 23 of the shell 2 and the outer jacket surface 34 of the wear element 3. In one embodiment, the wear element 3 is positioned concentrically, positioned in the shell 2. The wear element 3 is constituted by a material which has great resistance to abrasive and/or aggressive fluids. The wear element 3 may be constituted by a ceramic material, such as silicon carbide, silicon nitride, zirconium oxide, aluminum oxide or boron carbide, for example. The wear element 3 may be a monolithic, solid, integral casino. The annular space 91 is partially filled with a bonding mass 4. The bonding mass 4 is hyperelastic and may be constituted by a polymer material, such as polyurethane, silicone, fluorosilicone, polyacrylate, neoprene, fluorocarbon and nitrile, for example. In the drawings, two exemplary embodiments are shown in which the shell 2 and the wear element 3 project beyond the edge portion 45 of the bonding mass 4. Thereby an open annular-space portion 93 is formed at the end portions 11, 12. The edge portion 35 of the wear element 3 forms a first end surface and the edge portion 25 of the shell 2 forms a second end surface. The wear element 3 may be positioned in the shell 2 in such a way that the first end surface is parallel to the second end surface, as shown in the figures. This means that the edge surface 35 of the wear element 3 projects from the shell 2 by an equal distance along the circumferential edge portion 25 of the shell 2.

On an inner jacket surface 33 at its first end portion 51, the end piece 5 is provided with a stepping which forms a shoulder 57. In the shoulder 57, a circumferential groove 58 is formed, extending in the longitudinal direction of the end piece 5. An axially acting resilient element 61 is positioned in the groove 58. The resilient element 61 may be constituted by a metallic, axially acting spring or an O-ring constituted by an elastomer.

Figure 7A:
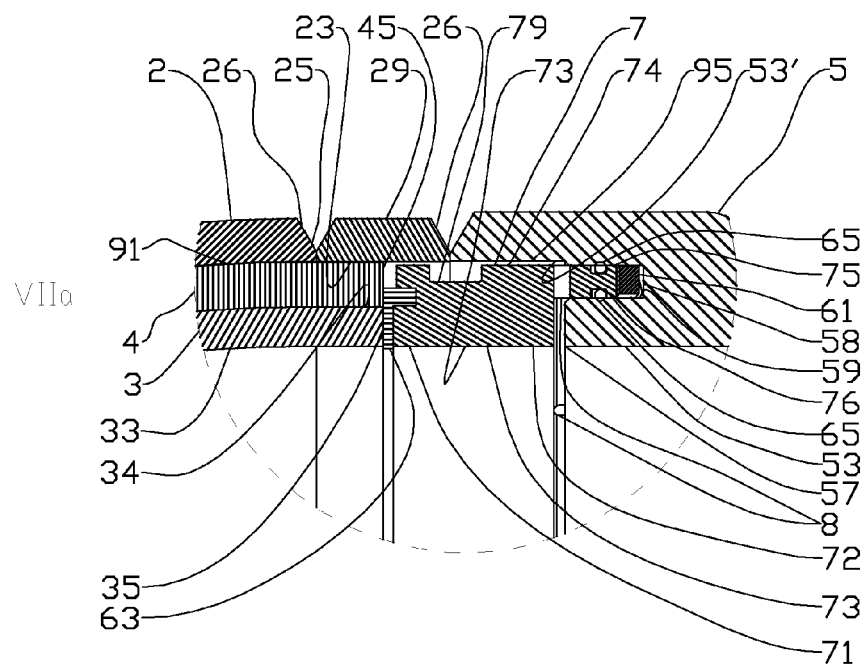
FIGS. 7A-7B show, on a larger scale, details of the section shown in FIG. 6.

In its position of application, the tubular component 1 is provided with a circular seal housing 7 between the wear element 3 and the end piece 5. The seal housing 7 may be constituted by a metal, a metal alloy or a composite material. At its first end portion 71, on an inner jacket surface 73, the seal housing 7 is provided, in one embodiment, with a stepping which forms a shoulder 77. The seal housing 7 is provided with a first sealing element 63 which lies sealingly between the end surface 35 of the wear element 3 and the shoulder 77. The seal housing 7 is further provided with a sealing element which lies sealingly between the outer jacket surface 34 of the wear element 3 and the inner jacket surface 73' of the seal housing 7. In the FIGS. 3 and 7A, a first sealing element 63 is shown as one sealing element 63 sealing between the end surface 35 and the shoulder 77 and sealing between the outer jacket surface 34 and the inner jacket surface 73'. In an alternative embodiment shown in FIG. 7B, the sealing element 63 is constituted by two separate sealing elements 63, 63', wherein 63' constitutes a radial positioning element. For the operation of the invention, it is not necessary for the sealing element 63' to be sealing between the outer jacket surface 34 and the inner jacket surface 73'. The sealing element 63' may therefore, in a further alternative embodiment, be constituted by a radial, sinuous spring, for example, which is arranged to position the wear element 3 radially. The first sealing element 63 may be constituted by an elastomer.

In a portion 72 facing the end piece 5, the seal housing 7 is provided with a ring 75. The ring 75 is arranged to fit complementarily in the groove 58 and will abut against the resilient element 61. The ring 75 is provided with at least one second sealing element 65 which prevents fluid and foreign bodies from penetrating to the resilient element 61 in the groove 58. The sealing element 65 may be constituted by an O-ring which is positioned in a groove 76 in the ring 75.

In a position of application, a second annular space 95 is formed between the inner jacket surface 53' of the end piece 5 and the outer jacket surface 74 of the seal housing 7. In its jacket, the seal housing 7 is provided with radial bores 8 forming a fluid connection between the fluid channel 13 and the second annular space 95.

Figure 3:
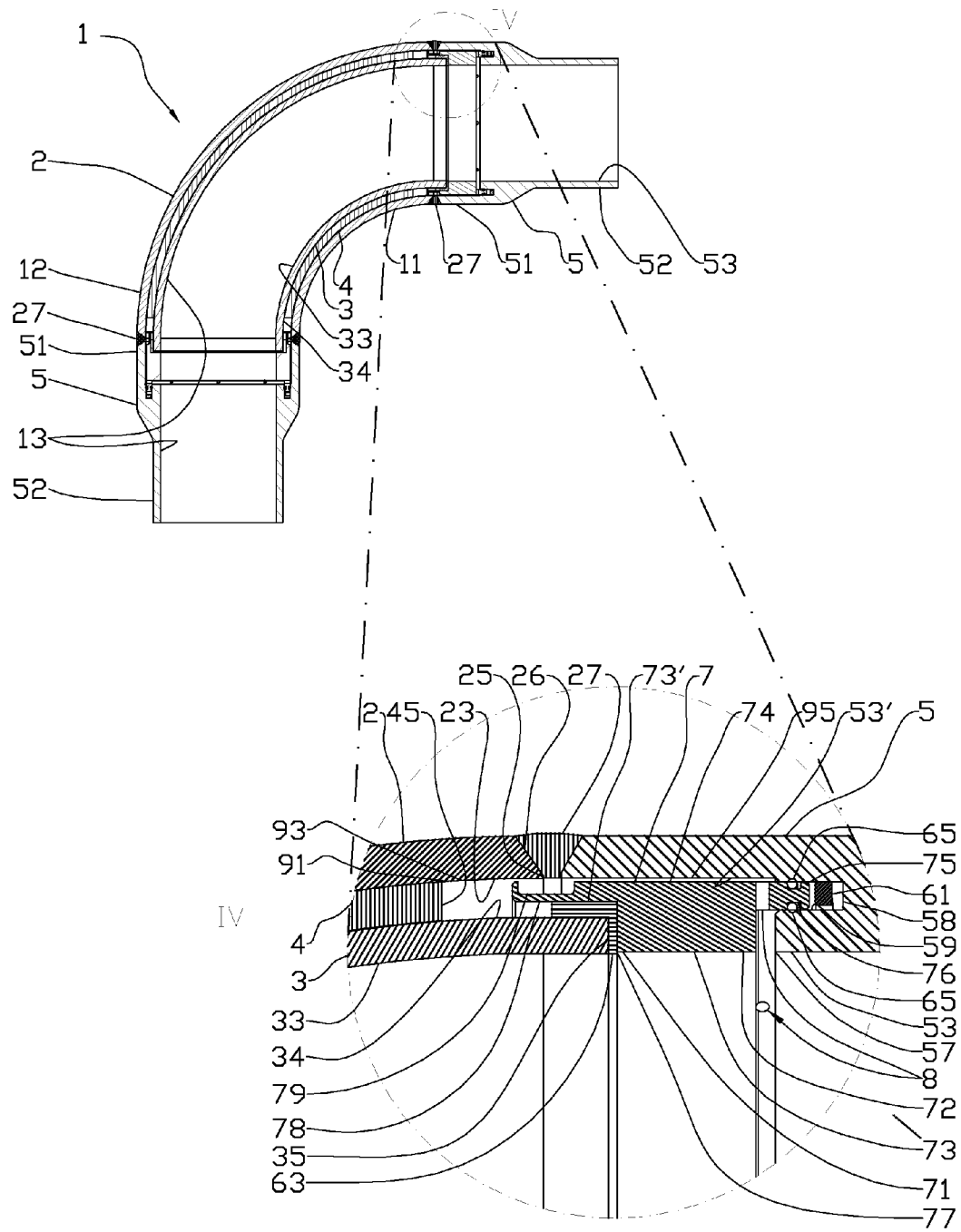
FIG. 3 shows a section through the tubular component.
Figure 4:
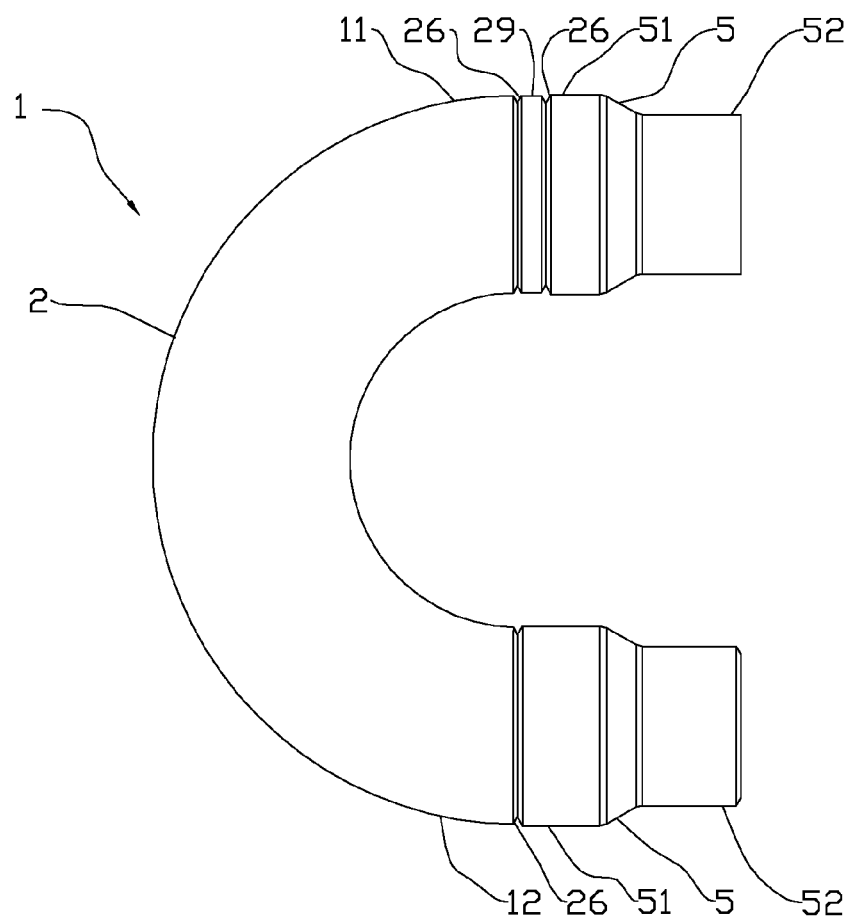
FIG. 4 shows a side view of another tubular component made with two other alternative embodiments.
Figure 5:
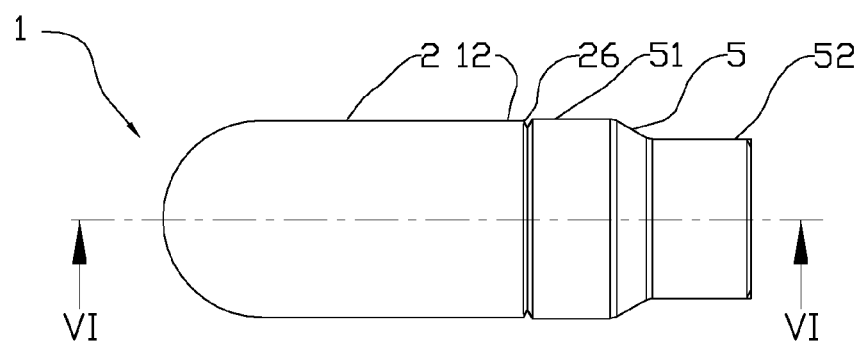
FIG. 5 shows, on the same scale as FIG. 4, a top view of the tubular component.
Figure 6:
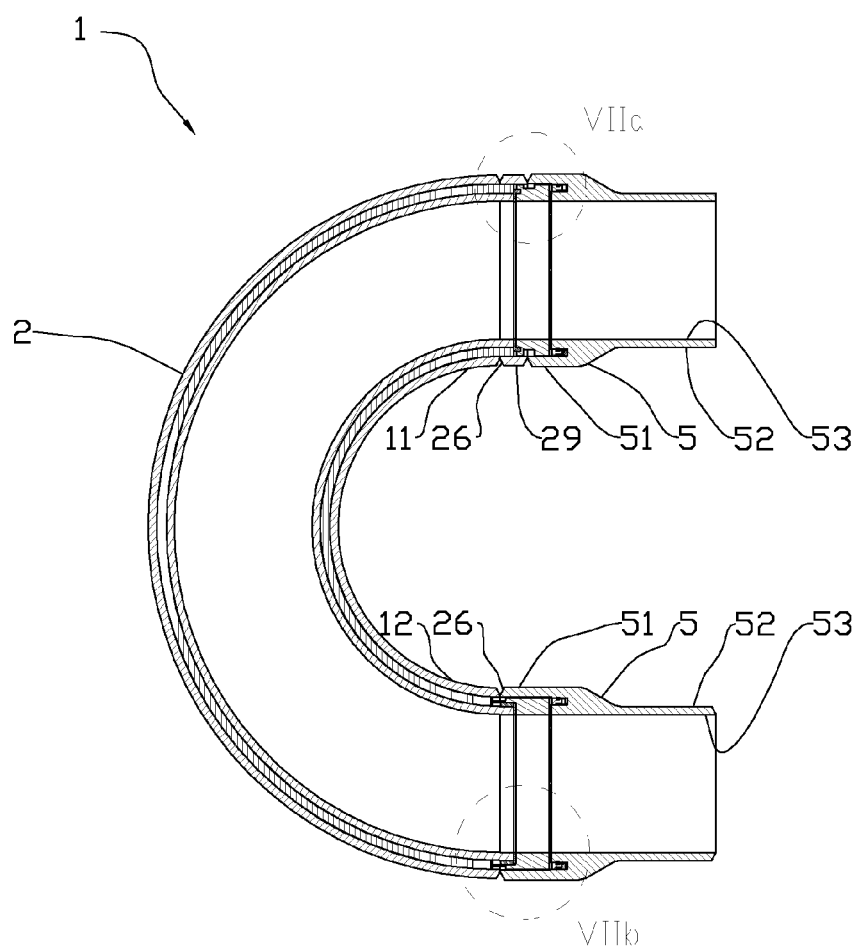
FIG. 6 shows a section through the tubular component shown in FIG. 4.
Figure 7B:
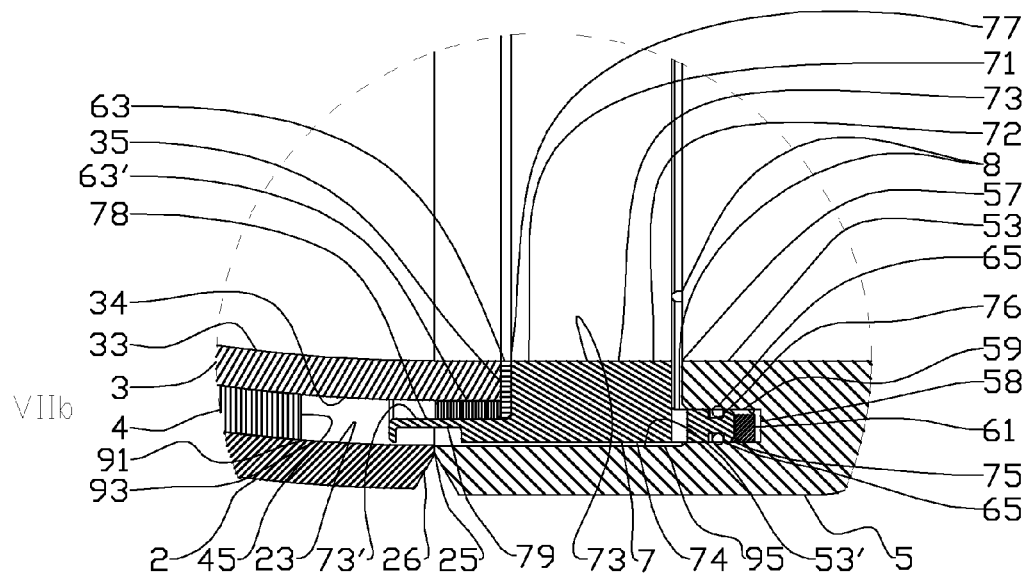

In one embodiment as shown in the FIGS. 3 and 7B, the seal housing 7 may be provided with a heat shield 78 projecting, in the position of application, into the open annular space portion 93. On the outer jacket surface of the seal housing 7, the heat shield 78 is provided with a circular recess 79, so that the welding groove 26 may be filled completely with a weld 27. The heat shield 78 protects the first sealing element 63 and the bonding mass 4 from heat from the welding work.

Figure 8:
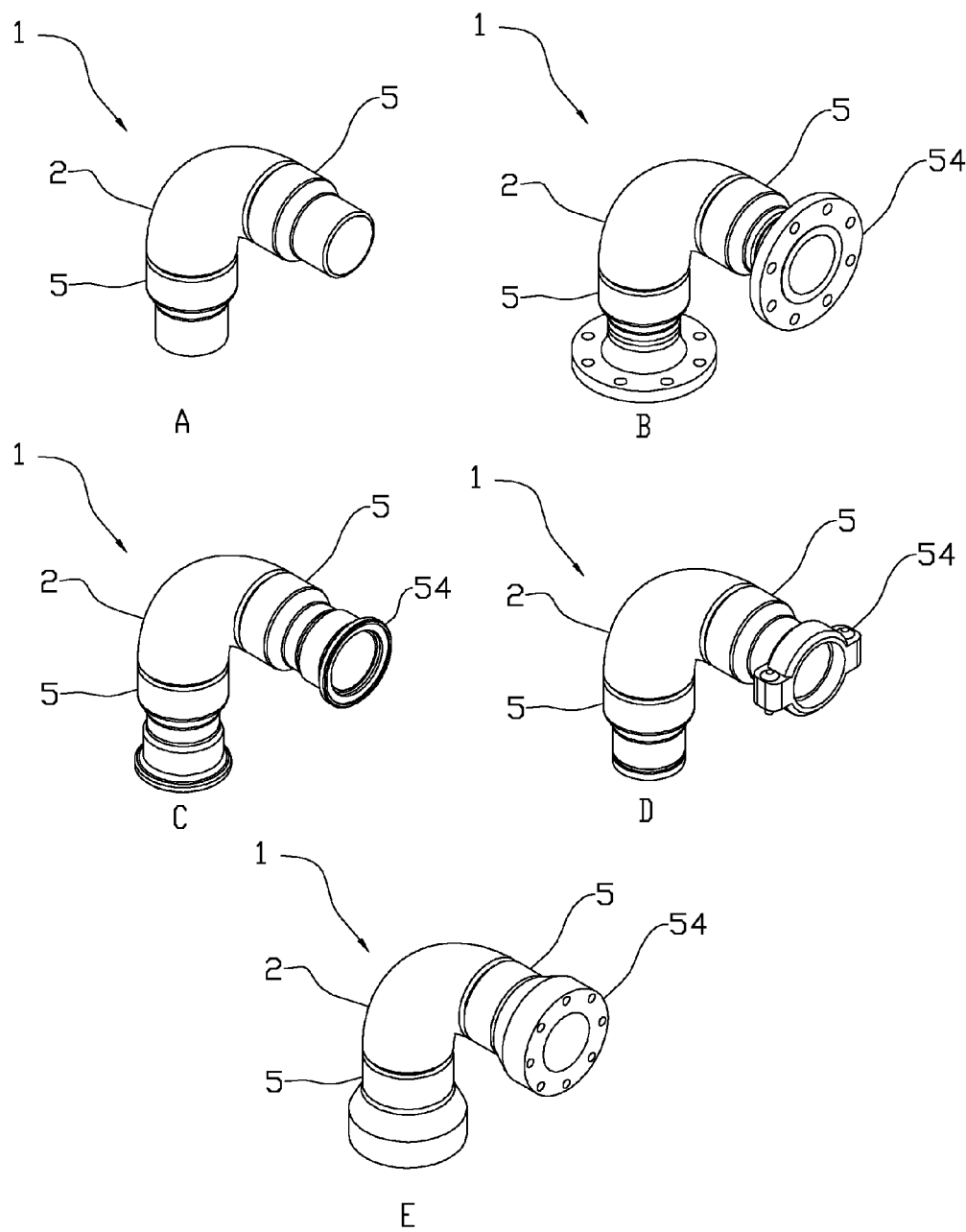
FIGS. 8A-E show perspective views, on a smaller scale, of alternative embodiments of the end piece of a tubular component for the attachment of the component into a pipe system.

At its second end portion 52, the end piece 5 may be provided with fastening means 54 for the attachment of the tubular component 1 to a pipe system (not shown). The pipe system may be a pipeline of a kind known per se. Examples of such fastening means 54 which are known within the art are shown in FIG. 8. FIG. 8A shows a welding end, FIG. 8B shows a plane flange, FIG. 8C shows a so-called hub, FIG. 8D shows an end piece with a grooved clamp, and FIG. 8E shows a compact flange.

The fluid channel 13 extends through the tubular component 1 and the end piece 5 without any restrictions, as the inner jacket surface 33 of the end piece 5, the inner jacket surface 73 of the seal housing 7 and the inner jacket surface 33 of the wear element 3 are of the same internal diameter. The wear element 3 is hyperelastically connected to the shell 2. This has the advantage of any thermal expansion or shrinkage of the shell 2 not propagating to the wear element 3. Particles in the fluid that is being conveyed through the pipe system may impinge on the wear element 3 with great force as the flow direction changes. The impact against the wear element 3 is dampened by the bonding mass 4. The hyperelastic bonding mass 4 also allows the wear element 3 to twist somewhat within the shell 2.

Thermal expansion or shrinkage of the end piece 5 will be absorbed by the axially resilient element 61 and the first sealing element 63 and, thus, will not affect the wear element 3. The seal housing 7 allows a radial movement of the wear element 3 by the first sealing element 63 being elastic in a radial direction and by the ring 75 having some clearance within the groove 58. The clearance allows the centre axis of the seal housing 7 to deviate from the centre axis of the wear element 3 and the centre axis of the end piece 5 and not be parallel to these either.

The fluid pressure against the free outer jacket surface 34 of the wear element 3 is substantially in pressure balance with the fluid pressure against the inner jacket surface 33 by there being fluid communication between the open annular-space portion 93 and the fluid channel 13 through the annular space 95 and the bores 8. The wear element 3 is thereby not subjected to a buckling load in this area in which the wear element 3 is not supported by the bonding mass 4. The bonding mass 4 may not support this area if the end piece 5 is to be attached to the shell 2 with a weld 27, such as a butt weld in the welding groove 26, for example, because of the high temperature used in welding. The reduced pressure difference between the open annular-space portion 93 and the fluid channel 13 in the straight stretches of the wear element 3 in the critical transition between the wear element 3 and the other components in the pipe system substantially reduces the mechanical stresses in the transition. In addition to extended lifetime, it is also achieved that either the process pressure of the fluid or the operating temperature or both may be increased substantially in pipe systems in accordance with the invention compared with known solutions.

If the pipe component 1 is constituted by a straight pipe, it is sufficient to provide the tubular component 1 with one seal housing 7 in one end portion 11, 12 of the tubular component 1.

To the outer jacket surface 34 of the wear element 3 and the inner jacket surface 23 of the shell 2, a suitable primer of a kind known per se is applied. The wear element 3 is positioned in the shell 2 in a suitable jig of a kind known per se (not shown). The jig holds the wear element 3 fixed in a manner known per se, so that the wear element 3 is in a desired position inside the shell 2. The desired position may be a concentric position. A bottom stuffing strip (not shown) is positioned in the annular space 91 in the lower and outermost part of the annular space 91. The hyperelastic bonding mass 4 is filled into the annular space 91 and in such a way that ambient gas may be evacuated. The annular space 91 is filled up until an open annular-space portion 93 remains.

For illustrative purposes, in FIGS. 4-7(A, B), a U-bend 1 is shown, provided with a wear element 3 in accordance with the invention, in which the end portions 11, 12 include alternative embodiments. In the FIGS. 6 and 7A it is shown that the end portion 11 of the shell 2 has been extended by a transition piece 29 forming a straight stretch before the end piece 5. The edge portion 45 of the bonding mass 4 and the edge portion 35 of the wear element 3 project beyond the edge portion 25 of the shell 2. The annular space 91 is completely filled up with bonding mass 4 so that no annular-space portion 93 is formed. The seal housing 7 is formed without the shoulder 77 and the heat shield 78. The circumferential groove 79 is formed in the outer jacket surface 74 of the seal housing 7. In an embodiment in which the edge portion 35 of the wear element 3 does not project beyond the edge portion 45 of the bonding mass 4, the bores 8 and the second annular space 95 may be left out as there will be no buckling load against the inner jacket surface 33 of the wear element 3.

In the drawings, it is shown that the wear element 3 is positioned in the shell 2 in such a way that the first end surface is parallel to the second end surface. That is to say, the edge portion 35 of the wear element 3 is projecting from the shell 2 by an equal distance along the circumferential edge portion 25 of the shell 2. The invention is not limited to this, as the seal housing 7 may be adapted for a geometry in which the edge portion 35 projects by a varying distance from the edge portion 25.

The invention claimed is:

1. A tubular component in a pipe system, the tubular component comprising an external shell having a first end portion and a second end portion spaced from the first end portion, and an internal, tubular, solid, integral wear element which extends continuously in a single unit between the first end portion and the second end portion, and is attached to an inner jacket surface of the shell with a bonding mass in a first annular space formed between an outer jacket surface of the wear element and the inner jacket surface of the shell, wherein the bonding mass is constituted by a hyperelastic material, wherein in at least one end portion, the tubular component is provided with an end piece which, in a first end portion facing the tubular component, is provided with an internal stepping which forms a shoulder in an inner jacket surface of the end piece and, in the shoulder, is provided with a circumferential groove in the axial direction towards a second end portion of the end piece, arranged to accommodate an axially acting resilient element, and wherein in the at least one end portion, the tubular component is provided with a movable, radial seal housing which, in a portion facing the tubular component, is arranged to accommodate a first sealing element arranged to seal axially between an end surface of the wear element and the seal housing, and in a portion facing away from the tubular component, the seal housing being provided with a ring complementarily engaged against a side surface of the circumferential groove of the end piece and configured to be preloaded and abut against the axially acting resilient element of the end piece, the seal housing further being provided with an inner jacket surface facing a fluid channel of the tubular component and wherein any expansion and contraction of the end piece is absorbed by the axially resilient element and the first sealing element without affecting the wear element.

2. The tubular component in accordance with claim 1, wherein the wear element is constituted by a monolithic ceramic material.

3. The tubular component in accordance with claim 1, wherein the ring of the seal housing is provided with at least one second sealing element arranged to seal between the ring and the side surface forming the groove.

4. The tubular component in accordance with claim 1, wherein the first sealing element of the seal housing is arranged to position the wear element in a radial direction.

5. The tubular component according to claim 1, wherein the first sealing element of the seal housing is constituted by a sealing element and a radial positioning element.

6. The tubular component in accordance with claim 5, wherein an outer jacket surface of the seal housing and the inner jacket surface of the end piece form a second annular space between them, and the seal housing is provided with at least one radial, through-going bore so that the second annular space is in fluid communication with the fluid channel of the tubular component.

7. The tubular component in accordance with claim 1, wherein the end portion of the seal housing facing the tubular component forms a heat shield.

8. The tubular component in accordance with claim 1, wherein the shell and the wear element of the tubular component project beyond the edge portion of the bonding mass, forming an open annular-space portion.

9. The tubular component in accordance with claim 1, wherein an end piece is attached to the shell with a fastening means selected from a group consisting of a weld, a flange connection, integrated grooving, and a hub connection.

10. The tubular component in accordance with claim 9, wherein at its second end portion, the end piece is provided with a fastening means arranged to attach the tubular component to a pipe system, the fastening means being selected from a group consisting of a weld, a flange connection, integrated grooving and a hub connection.

11. The tubular component in accordance with claim 1, wherein the hyperelastic bonding mass is selected from a group consisting of polyurethane, silicone, fluorosilicone, polyacrylate, neoprene, fluorocarbon, and nitrile.

12. A pipe system for conveying at least one of an abrasive and aggressive fluid, wherein the pipe system is provided with at least one tubular component comprising: an external shell having a first end portion and a second end portion spaced from the first end portion, and an internal, tubular, solid, integral wear element which extends continuously in a single unit between the first end portion and the second end portion and is attached to an inner jacket surface of the shell with a bonding mass in a first annular space formed between an outer jacket surface of the wear element and the inner jacket surface of the shell, wherein the bonding mass is constituted by a hyperelastic material, wherein in at least one end portion, the tubular component is provided with an end piece which, in a first end portion facing the tubular component, is provided with an internal stepping which forms a shoulder in an inner jacket surface of the end piece and, in the shoulder, is provided with a circumferential groove in the axial direction towards a second end portion of the end piece, arranged to accommodate an axially acting resilient element, and wherein in the at least one end portion, the tubular component is provided with a movable, radial seal housing which, in a portion facing the tubular component, is arranged to accommodate a first sealing element arranged to seal axially between an end surface of the wear element and the seal housing, and in a portion facing away from the tubular component, the seal housing being provided with a ring complementarily engaged against a side surface of the circumferential groove of the end piece and configured to be preloaded and abut against the axially acting resilient element of the end piece, the seal housing further being provided with an inner jacket surface facing a fluid channel of the tubular component and wherein any expansion or contraction of the end piece is absorbed by the axially resilient element and the first sealing element without affecting the wear element.

13. A method of forming a tubular component having an external shell provided with a first end portion and a second end portion spaced from the first end portion and a wear element, the method including the steps of:
a) positioning the wear element inside the shell of the tubular component such that the wear element extends continuously in a single unit between the first end portion and the second end portion, and in such a way that a first annular space is formed between an outer jacket surface of the wear element and an inner jacket surface of the shell;
b) positioning a sealing bottom strip at the first end portion in the first annular space;
c) filling up the first annular space with a hyperelastic bonding mass from the second end portion;
d) providing, in at least one end portion, the tubular component with an end piece which, in a first end portion facing the tubular component, is provided with an internal stepping which forms a shoulder in an inner jacket surface of the end piece and, in the shoulder, is provided with a circumferential groove in the axial direction towards a second end portion of the end piece, arranged to accommodate an axially acting resilient element, and
e) providing in the at least one end portion, a movable radial seal housing which, in a portion facing the tubular component, is arranged to accommodate a first sealing element arranged to seal axially between an end surface of the wear element and the seal housing, and in a portion facing away from the tubular component, is provided with a ring complementarily engaged against a side surface of the circumferential groove of the end piece, and configured to be preloaded and abut against the axially acting resilient element of the end piece, the seal housing being provided with an inner jacket surface facing a fluid channel of the tubular component and wherein any expansion or contraction of the end piece is absorbed by the axially resilient element and the first sealing element without affecting the wear element.

14. The method in accordance with claim 13, wherein filling the first annular space with the hyperelastic bonding mass is terminated before the entire first annular space has been filled at the second end portion of the tubular component, so that an open annular-space portion is formed in the first annular space.

15. A method of forming a tubular component having a tubular, solid integral wear element and an external shell wherein the external shell includes a first end portion and a second end portion spaced from the first end portion, the method comprising the steps of:
a) positioning the wear element inside the external shell such that the wear element extends continuously in a single unit between the first end portion and the second end portion, and such that a first annular space is formed between an inner jacket surface of the shell and an outer jacket surface of the wear element;

b) providing a hyperelastic bonding mass in the first annular space between the external shell and the wear element;

c) providing, in at least one end portion, the tubular component with an end piece which, in a first end portion facing the tubular component, is provided with an internal stepping which forms a shoulder in an inner jacket surface of the end piece and, in the shoulder, is provided with a circumferential groove in the axial direction towards a second end portion of the end piece, arranged to accommodate an axially acting resilient element, and d) providing in the at least one end portion, a movable radial seal housing which, in a portion facing the tubular component, is arranged to accommodate a first sealing element arranged to seal axially between an end surface of the wear element and the seal housing, and in a portion facing away from the tubular component, is provided with a ring complementarily engaged against a side surface of the circumferential groove of the end piece, and configured to be preloaded and abut against the axially acting resilient element of the end piece, the seal housing being provided with an inner jacket surface facing a fluid channel of the tubular component and wherein any expansion or contraction of the end piece is absorbed by the axially resilient element and the first sealing element without affecting the wear element.

16. The tubular component of claim 1, wherein the external shell is solid.

17. The pipe system of claim 12, wherein the external shell is solid.

18. The method of claim 15, wherein the external shell is solid.

19. The tubular element of claim 1, wherein the first sealing element is separate from the seal housing, and the inner jacket surface of the seal housing is exposed to the fluid channel of the tubular component.

20. The pipe system of claim 12, wherein the first sealing element is separate from the seal housing, and the inner jacket surface of the seal housing is exposed to the fluid channel of the tubular component.

21. The method of claim 13, wherein the first sealing element is separate from the seal housing, and the inner jacket surface of the seal housing is exposed to the fluid channel of the tubular component.

22. The method of claim 15, wherein the first sealing element is separate from the seal housing, and the inner jacket surface of the seal housing is exposed to the fluid channel of the tubular component.

* * * * *